(12) United States Patent
Murata et al.

(10) Patent No.: US 12,057,996 B2
(45) Date of Patent: Aug. 6, 2024

(54) COMBINATION RULES CREATION DEVICE, METHOD AND PROGRAM

(71) Applicant: NIPPON TELEGRAPH AND TELEPHONE CORPORATION, Tokyo (JP)

(72) Inventors: Naomi Murata, Musashino (JP); Satoshi Suzuki, Musashino (JP); Haruhisa Nozue, Musashino (JP); Shunsuke Kanai, Musashino (JP); Kazuaki Akashi, Musashino (JP); Fumika Asai, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/026,100

(22) PCT Filed: Sep. 14, 2020

(86) PCT No.: PCT/JP2020/034670
§ 371 (c)(1),
(2) Date: Mar. 13, 2023

(87) PCT Pub. No.: WO2022/054269
PCT Pub. Date: Mar. 17, 2022

(65) Prior Publication Data
US 2023/0336409 A1 Oct. 19, 2023

(51) Int. Cl.
*H04L 41/069* (2022.01)
*H04L 41/0631* (2022.01)
(52) U.S. Cl.
CPC ........ *H04L 41/069* (2013.01); *H04L 41/0631* (2013.01)

(58) Field of Classification Search
CPC .......................... H04L 41/069; H04L 41/0631
(Continued)

(56) References Cited

U.S. PATENT DOCUMENTS 7,934,248 B1 *  4/2011  Yehuda ................... H04L 41/22
                                                               713/153
8,510,432 B2 *  8/2013  Bhattacharya ........ H04L 41/069
                                                               709/224
(Continued)

FOREIGN PATENT DOCUMENTS

CN       115065592 A  *  9/2022
CN       115118582 A  *  9/2022
(Continued)

*Primary Examiner* — Melvin H Pollack
(74) *Attorney, Agent, or Firm* — Harness, Dickey & Pierce, P.L.C.

(57) ABSTRACT

According to one aspect of the present invention, when a combination rule of event information to be monitored is created by aggregating a plurality of pieces of event information generated in a network, an information processing device executes: collecting the plurality of pieces of event information; calculating a correlation value for a plurality of combinations of event information including m (m≥3) pieces of event information generated from the plurality of pieces of event information collected; selecting a combination of the pieces of event information for which the calculated correlation value is equal to or higher than a predetermined value, wherein the correlation value increases as the number of times or frequency that the event information included in a combination appears according to the combination increases and also increases as a time interval between the pieces of event information included in the combination decreases; and generating the combination rule on the basis of the event information included in the selected combination.

9 Claims, 10 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 8,713,049 B2* | 4/2014 | Jain | ................... | G06F 16/24534 |
| | | | | 707/769 |
| 8,732,259 B2* | 5/2014 | Parello | ................. | H04L 41/069 |
| | | | | 709/207 |
| 8,832,496 B2* | 9/2014 | Matsuda | ............... | H04L 41/069 |
| | | | | 714/25 |
| 9,021,304 B2* | 4/2015 | Tonouchi | .............. | G06F 11/079 |
| | | | | 714/25 |
| 9,124,489 B2* | 9/2015 | Devlic | .................... | H04L 43/10 |
| 9,239,988 B2* | 1/2016 | Dinger | .................... | H04L 41/069 |
| 10,142,205 B2* | 11/2018 | Balasubramanian | ... | H04L 43/16 |
| 10,223,145 B1* | 3/2019 | Neogy | ................ | G06F 11/3006 |
| 10,469,309 B1* | 11/2019 | Gupta | ................. | H04L 41/0609 |
| 10,616,040 B2* | 4/2020 | Huang | .................. | H04L 41/142 |
| 10,778,503 B2* | 9/2020 | Malboubi | ........... | H04L 63/1433 |
| 11,294,754 B2* | 4/2022 | Xu | ....................... | G06F 11/0709 |
| 11,296,925 B2* | 4/2022 | Yamashita | ............. | H04L 41/14 |
| 11,379,473 B1* | 7/2022 | Paiz | ....................... | G06F 16/243 |
| 11,507,562 B1* | 11/2022 | Luedtke | .................... | H04L 9/50 |
| 11,537,627 B1* | 12/2022 | Baskaran | ............. | G06F 16/248 |
| 11,659,023 B2* | 5/2023 | Shelton, IV | ........... | G16H 40/20 |
| | | | | 709/227 |
| 11,671,312 B2* | 6/2023 | Puri | ........................ | H04L 43/04 |
| | | | | 709/224 |
| 11,715,051 B1* | 8/2023 | Baskaran | .......... | G06F 16/90335 |
| | | | | 707/758 |
| 11,774,944 B2* | 10/2023 | Cella | ....................... | G06N 20/00 |
| | | | | 700/275 |
| 2012/0072455 A1* | 3/2012 | Jain | ..................... | G06F 16/2452 |
| | | | | 707/E17.014 |
| 2012/0084432 A1* | 4/2012 | Soprovich | ............ | H04L 41/069 |
| | | | | 709/224 |
| 2013/0042147 A1* | 2/2013 | Tonouchi | ............ | G06F 11/0781 |
| | | | | 714/37 |
| 2016/0191349 A1* | 6/2016 | Buege | ................ | H04L 41/5067 |
| | | | | 709/224 |
| 2018/0315089 A1* | 11/2018 | Nash | .................. | G06Q 30/0267 |
| 2019/0303726 A1* | 10/2019 | Côté | ....................... | H04L 41/16 |
| 2021/0225500 A1* | 7/2021 | Pronk | .................... | G16H 40/63 |
| 2021/0307621 A1* | 10/2021 | Svenson | .............. | A61B 5/7267 |

FOREIGN PATENT DOCUMENTS

| | | | | |
|---|---|---|---|---|
| CN | 115484151 A | * | 12/2022 | |
| JP | 2007172131 A | * | 7/2007 | |
| JP | 2013540308 A | | 10/2013 | |
| JP | 6637854 B2 | * | 1/2020 | |
| WO | WO-2011111599 A1 | * | 9/2011 | .......... G06F 11/0781 |

* cited by examiner

Fig. 8A

Link Down + Link UP →

Link Down + Link UP + NATURAL RESTORATION

COMBINATION RULES CREATION DEVICE, METHOD AND PROGRAM

CROSS-REFERENCE TO RELATED APPLICATIONS

This application is a 371 U.S. National Phase of International Application No. PCT/JP2020/034670, filed on Sep. 14, 2020. The entire disclosure of the above application is incorporated herein by reference.

TECHNICAL FIELD

One aspect of the present invention relates to a combination rule creation device, a method, and a program, each of which is used in a network monitoring device that estimates a location serving as a cause of a network failure based on, for example, a failure event generated from a network device.

BACKGROUND ART

In recent years, with the advancement of the Internet of Things (IoT), a large number of network devices such as gateways, routers, and various servers have come to be connected to communication networks. Accordingly, it is extremely important to estimate, in a case where a failure occurs in, for example, a network device, a location at which the failure has occurred for stable operation of the communication network.

For example, Patent Literature 1 suggests a technology of extracting occurrence patterns of a wide variety of failure events generated from a plurality of network devices, creating a rule for determining a location at which a failure has occurred on the basis of the occurrence patterns, and collating the occurrence patterns of the failure events that have occurred thereafter with the rule to estimate a location at which a failure has occurred. Additionally, when failure events occur frequently, it takes a very long time to create a rule for determining a location at which failure has occurred, and thus, for example, Patent Literature 1 also teaches aggregating a large number of failure events into characteristic events.

CITATION LIST

Patent Literature

Patent Literature 1: JP 6637854 B1

SUMMARY OF INVENTION

Technical Problem

However, aggregating a large number of failure events that have occurred into characteristic events is generally performed by determination of a network administrator in many cases. Consequently, it takes a lot of labor and time to aggregate the failure events.

The present invention is intended to solve the problems stated above, and an object of the present invention is to provide a technology that enables creation processing of a combination rule including an event information aggregation operation related to failure to be performed independently of a network administrator, thereby further improving efficiency of network management operation.

Solution to Problem

For solving the problems stated above, according to one aspect of the present invention, when a combination rule of event information to be monitored is created by aggregating a plurality of pieces of event information generated in a network, an information processing device executes: calculating a correlation value for a plurality of combinations of event information including m (m≥3) pieces of event information generated from the plurality of pieces of event information; selecting a combination of the pieces of event information for which the calculated correlation value is equal to or higher than a predetermined value, wherein the correlation value increases as the number of times or frequency that the event information included in a combination appears according to the combination increases and also increases as a time interval between the pieces of event information included in the combination decreases; and generating the combination rule on the basis of the event information included in the selected combination.

Advantageous Effects of Invention

According to one aspect of the present invention, it has been now found that the plurality of pieces of event information to be aggregated has a certain trend in the number of times of appearance according to a combination with a close temporal distance. The correlation value between pieces of event information is calculated on the basis of the number of times of appearance and the temporal distance between m pieces of event information included in a combination of event information, and a combination of event information to be aggregated is selected on the basis of the calculated correlation value. Therefore, the event information aggregation processing can be automatically performed without depending on the network administrator. Consequently, the workload of the network administrator and the processing load of the device creating the combination rule can be reduced, while the processing time is shortened, thereby further improving the efficiency of the network management operation.

BRIEF DESCRIPTION OF DRAWINGS

FIG. 8A is a diagram illustrating one example of a case where new event information is added to past event information.

DESCRIPTION OF EMBODIMENTS

Hereinafter, embodiments according to the present invention will be described with reference to the drawings.

Embodiment

Configuration Example (1) System

Figure 1:
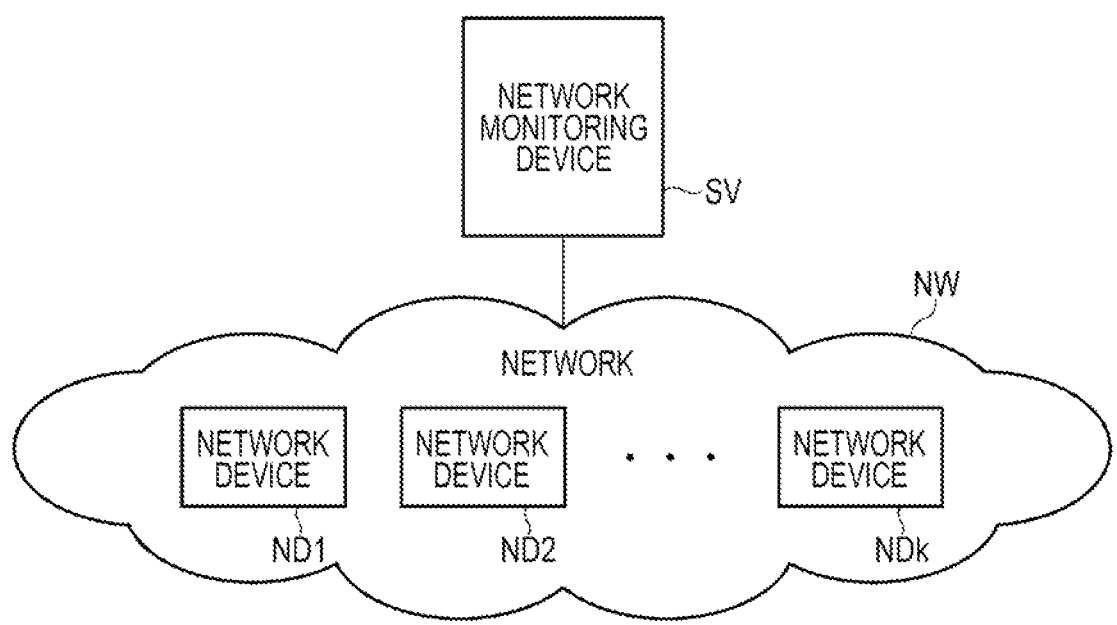
FIG. 1 is a schematic configuration diagram of a network system including a network monitoring device having a combination rule creation function according to one embodiment of the present invention.

FIG. 1 is a diagram illustrating an overall configuration of a network system including a network monitoring device having a combination rule creation function according to one embodiment of the present invention.

In this network system, a network monitoring device SV is provided in a network NW including a plurality of network devices ND1 to NDk, and failures of the plurality of network devices ND1 to NDk are monitored for by the network monitoring device SV.

The network devices ND1 to NDk include, for example, a gateway and a router, and connect a local area network (LAN) to a higher network (worldwide network (WAN)) such as the Internet. The network device is not limited to the device connecting networks as stated above, and includes a relay device provided in the network, a server device connected to the network, and the like.

(2) Network Monitoring Device

Figure 2:
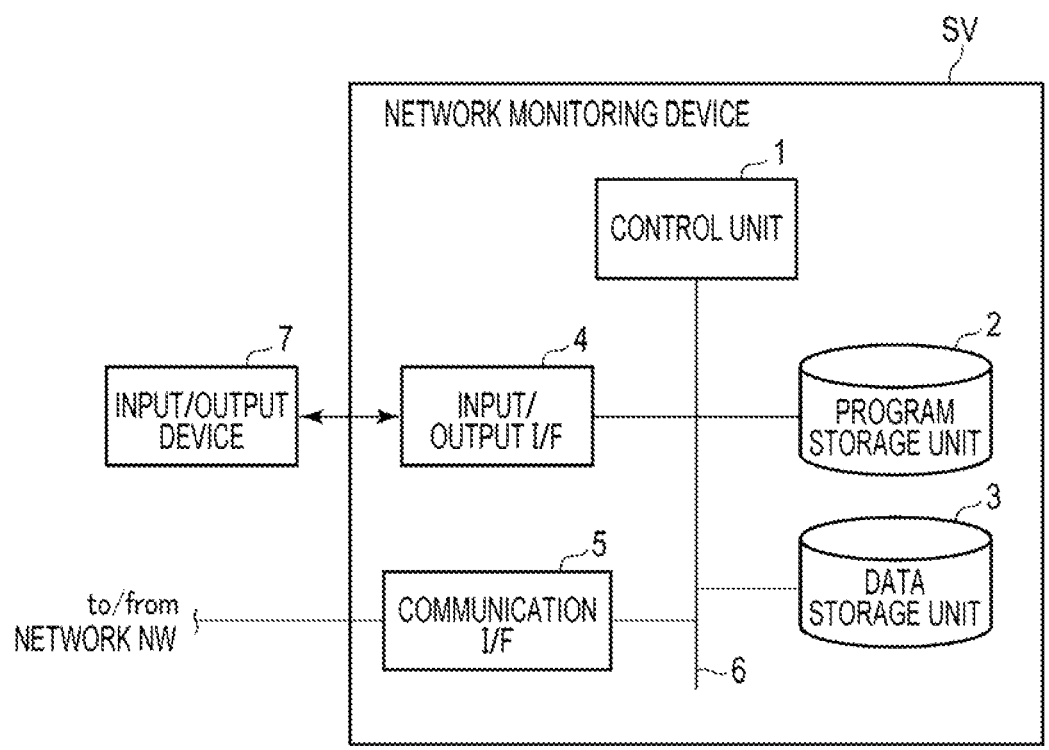
FIG. 2 is a block diagram illustrating a hardware configuration example of the network monitoring device shown in FIG. 1.
Figure 3:
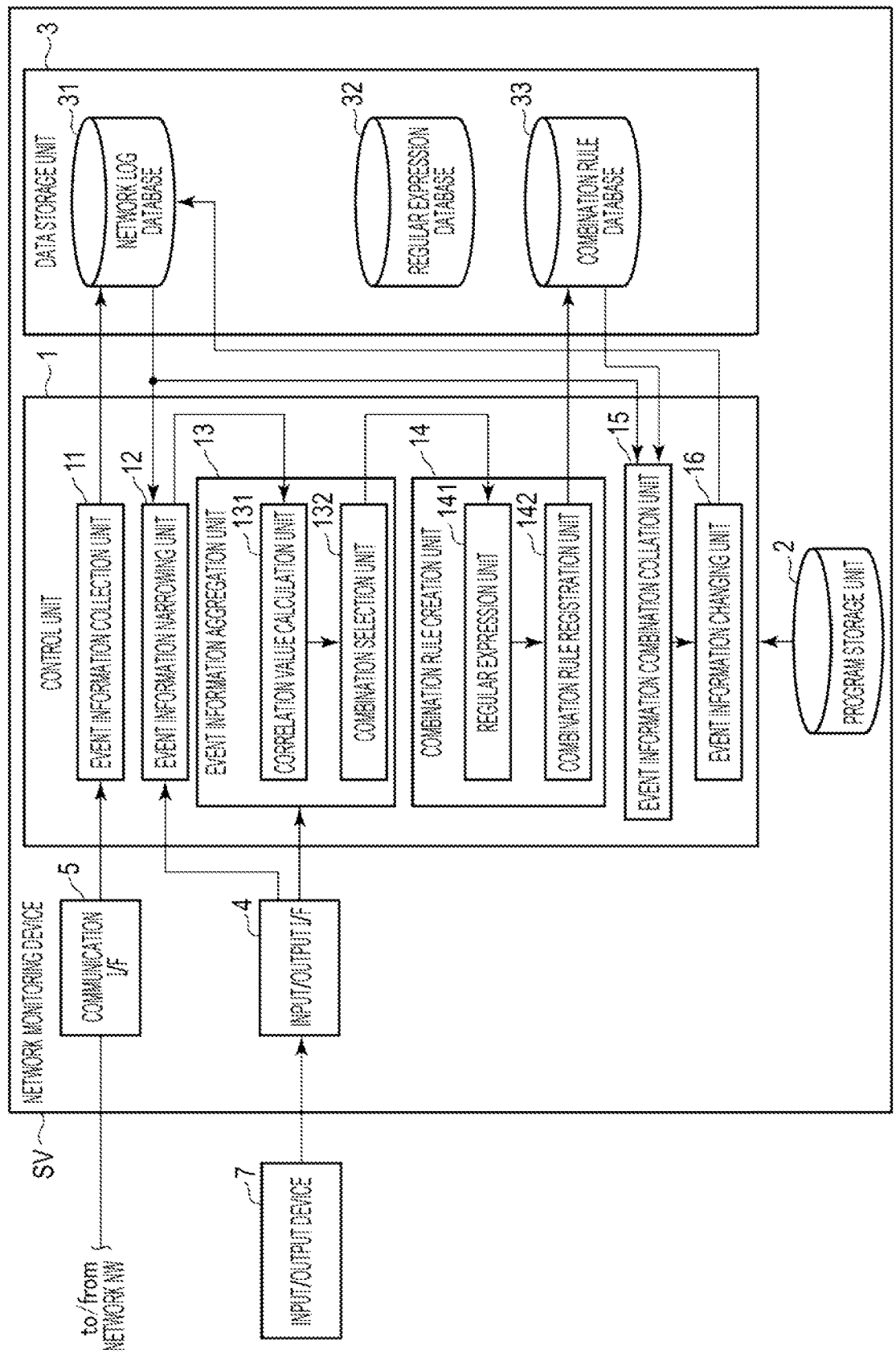
FIG. 3 is a block diagram illustrating a software configuration example of the network monitoring device shown in FIG. 1.

FIGS. 2 and 3 are block diagrams illustrating a hardware configuration and a software configuration of the network monitoring device SV, respectively.

The network monitoring device SV includes, for example, a server computer or a personal computer. The network monitoring device SV includes a control unit 1 having a hardware processor such as a central processing unit (CPU). A program storage unit 2, a data storage unit 3, an input/output interface (input/output I/F) 4, and a communication interface (communication I/F) 5 are connected to the control unit 1 via a bus 6.

The program storage unit 2 uses, for example, a non-volatile memory capable of writing and reading at any time, such as a hard disk drive (HDD) or a solid state drive (SSD), as a main storage medium, and a program for executing various processes according to one embodiment of the present invention is stored in a storage area thereof, together with middleware such as an operating system (OS). The storage medium may be configured by combining the HDD or SSD with a read only memory (ROM).

The data storage unit 3 is, for example, a combination of an HDD or SSD with a random access memory (RAM), and the storage area is provided with a network log database 31, a regular expression database 32, and a combination rule database 33 used in one embodiment of the present invention.

The network log database 31 stores a plurality of pieces of event information collected from the plurality of network devices ND1 to NDk in time series in association with occurrence times thereof. The event information includes, for example, various alarms due to failure or malfunction of the network devices ND1 to NDk, and information indicating a transition of an operation state of the devices such as Link Down and Link Up of the network devices ND1 to NDk. Hereinafter, the event information is also referred to as a network log, an alarm log, or simply a log.

The regular expression database 32 is used to store in advance, for example, a method of describing a regular expression of an important keyword of the event information to be monitored.

The combination rule database 33 is used to store a combination rule generated by the control unit 1 for changing a combination of pieces of event information to be monitored to new event information to be a change destination together with information indicating a change pattern of the event information.

The input/output I/F 4 is connected to an input/output device 7. The input/output device 7 includes, for example, an input device such as a keyboard, a storage device in which data is stored, and a plurality of man-machine interface devices such as a display device or a print device.

The input/output I/F 4 acquires, from the input device, for example, a condition for narrowing down event information to be monitored and a threshold for determining a correlation value of a combination of event information, which are specified by the network administrator, and passes them to the control unit 1. Further, the input/output I/F 4 outputs display data or print data representing a network monitoring result output from the control unit 1 to a display device or a print device, respectively, thereby causing the display data to be displayed or the print data to be printed.

The communication I/F 5 receives event information generated from the network devices ND1 to NDk via the network NW under the control of the control unit 1, and for example, an interface for a wired network is adopted as the communication I/F 5.

The control unit 1 includes an event information collection unit 11, an event information narrowing unit 12, an event information aggregation unit 13, a combination rule generation unit 14, an event information combination collation unit 15, and an event information changing unit 16 as processing functions according to one embodiment of the present invention. Each of these processing units 11 to 16 is implemented by causing a hardware processor to execute a program stored in the program storage unit 2.

The event information collection unit 11 receives, via the communication I/F 5, event information related to a failure of a device such as a failure or malfunction, or a communication failure, transmitted from each of the network devices ND1 to NDk, and performs processing of storing the received event information in the network log database 31 in time series on the basis of an event occurrence time included in the event information.

The event information narrowing unit 12 performs processing of narrowing down event information to be monitored from pieces of event information stored in the network log database 31. The narrowing refers to, for example, processing of extracting event information including a keyword specified by the network administrator, or alternatively, processing of counting the number of appearances of pieces of event information stored in the network log database 31 for each type and extracting event information of which a number of appearances exceeds a threshold specified in advance.

The event information aggregation unit 13 performs processing of collecting, i.e. aggregating combinations of pieces of event information having a common occurrence pattern among the event information narrowed down by the event information narrowing unit 12 into a smaller number, and includes a correlation value calculation unit 131 and a combination selection unit 132. Functions of the correlation value calculation unit 131 and the combination selection unit 132 will be described in detail in Operation Example.

The combination rule generation unit 14 performs processing of generating a combination rule for changing the combination of pieces of event information to be monitored to the new event information to be the change destination on the basis of the combination of pieces of event information aggregated by the event information aggregation unit 13, and includes a regular expression unit 141 and a combination rule registration unit 142. Functions of the regular expression unit 141 and the combination rule registration unit 142 will also be described in detail in Operation Example.

The event information combination collation unit 15 reads pieces of event information having occurred in an analysis period designated in advance from the network log database 31 and extracts a combination of pieces of event information having different occurrence times or sharing the same occurrence time when a location at which failure has occurred in the analysis period is estimated. The extracted combinations are sequentially collated with the combinations of the event information defined in the plurality of combination rules stored in the combination rule database 33, and processing of determining whether there is a matching combination is performed.

In a case where the a combination of the extracted event information matches the a combination of the event information defined in any one of the combination rules as in a result of the collation by the event information combination collation unit 15, the event information changing unit 16 performs replacement processing of the event information according to the combination rule.

The event information changing unit 16 performs processing of changing the corresponding event information stored in the network log database 31 according to the change pattern stored in the combination rule database 33 together with the combination rule. The processing of changing the event information according to the change pattern will be described in Operation Example.

Operation Example

Operations of the network monitoring device SV configured as described above will be described hereinbelow.

(I) Creating Combination Rule (1) Principle

The principle of a combination rule creation operation in one embodiment will be described with reference to FIG. 4.

It is assumed that alarm logs A, B and C are sequentially generated as the event information. In the embodiment, when combinations CC1, CC2, . . . of the logs A, B, and C are defined, the number of times or frequency of appearance of the logs A, B and C in order according to the combinations is obtained as an index indicating a relationship between the logs A, B and C (step S1). At the same time, an appearance time difference between the logs A, B and C, that is, a temporal distance is obtained for each of the combinations CC1, CC2, . . . (step S2).

As the number of appearances or an appearance frequency increases, the correlation between the logs A, B and C becomes stronger, and it becomes more likely that the combinations of the logs A, B, and C will be able to be aggregated. As the temporal distance becomes shorter, the correlation between the logs A, B and C becomes stronger, and it becomes more likely that the combinations of the logs A, B, and C will be able to be aggregated.

A correlation value of the logs A, B, and C is calculated based on the number of appearances or the appearance frequency, as well as the temporal distance (step S3). In a case where the calculated correlation value is equal to or higher than a predetermined value, it is regarded that the combination of the logs A, B and C can be aggregated, and one representative combination is selected from the combinations CC1, CC2, . . . of the logs A, B and C (step S4). A combination rule is generated based on the selected combination of the logs A, B, and C and registered as a combination rule of event information to be monitored (step S5).

According to the processing as described above, pieces of event information repeatedly occurring with similar patterns among several pieces of event information occurring in the network are grouped into a smaller number in units of combinations thereof, so that a large number of pieces of event information can be grouped into representative event information to allow the event information to be aggregated into a smaller number. Consequently, the number of combination rules of event information to be monitored can be greatly reduced.

Accordingly, a learning time required to create the combination rule can be shortened, many of combination rules can be efficiently created in a short time, and the processing load of the network monitoring device SV can be reduced. Furthermore, since the aggregating the combinations of the event information can be automatically performed without depending on the network administrator, it is possible to greatly reduce the workload of the network administrator, and to further improve the efficiency of the network management operation together while reducing the processing load of the network monitoring device SV.

(2) Example

One example of the combination rule creation processing will be described hereinbelow. FIG. 4 is a flowchart illustrating one example of a processing procedure and processing details.

It is assumed that a large number of logs generated in the past for the network NW are already stored in the network log database 31.

(2-1) Narrowing Down of Target Log

The control unit 1 of the network monitoring device SV receives and saves designation information of a target network and designation information of a target log input by the network administrator via the input/output device 7, under the control of the event information narrowing unit 12, in steps S10 and S11. For example, in a case where the network NW includes a plurality of networks, the designation information of the target network designates a network to be monitored among these networks. The designation information of the target log specifies a log to be monitored, and includes, for example, a characteristic keyword, and a threshold of the number of appearances or the appearance frequency.

In step S12, the event information narrowing unit 12 extracts a log group generated by the network designated by the designation information of the target network from among a large number of logs stored in the network log database 31. At the same time, a log including a keyword designated by the designation information of the target log is extracted from the log group extracted for the designated network, or the number of appearances or the appearance frequency for each extracted log is obtained, thereby extracting a log in which the value of the number of appearances or the appearance frequency is equal to or higher than a threshold. Consequently, it is possible to narrow down logs for which a combination rule is created in advance.

(2-2) Aggregating Combination of Logs Based on Correlation Value

The control unit 1 of the network monitoring device SV executes processing of aggregating combinations of logs under the control of the event information aggregation unit 13 as follows.

Under the control of the correlation value calculation unit 131, a combination of logs including m (m 3) logs is generated by selecting logs in descending order of the number of appearances or the appearance frequency in step S13. In step S14, for the generated combination of logs, a correlation value of the combination of logs including the m logs is calculated as follows on the basis of the number of times or frequency that m logs appear according to the combination and an appearance time difference between the m logs.

That is, for example, when the number of appearances is X and the time difference is Y, the correlation value Z is expressed as follows:

$$Z=\alpha X+\beta(1/Y).$$

α and β are parameter values representing adjustment coefficients. By specifying the parameter values α and β, appropriate weights can be given to the number of appearances X and the time difference Y when the correlation value Z is calculated. When any one of the parameter values α and β is set to 0, the correlation value Z can be calculated using any one of the number of appearances X and the time difference Y.

Figure 4:
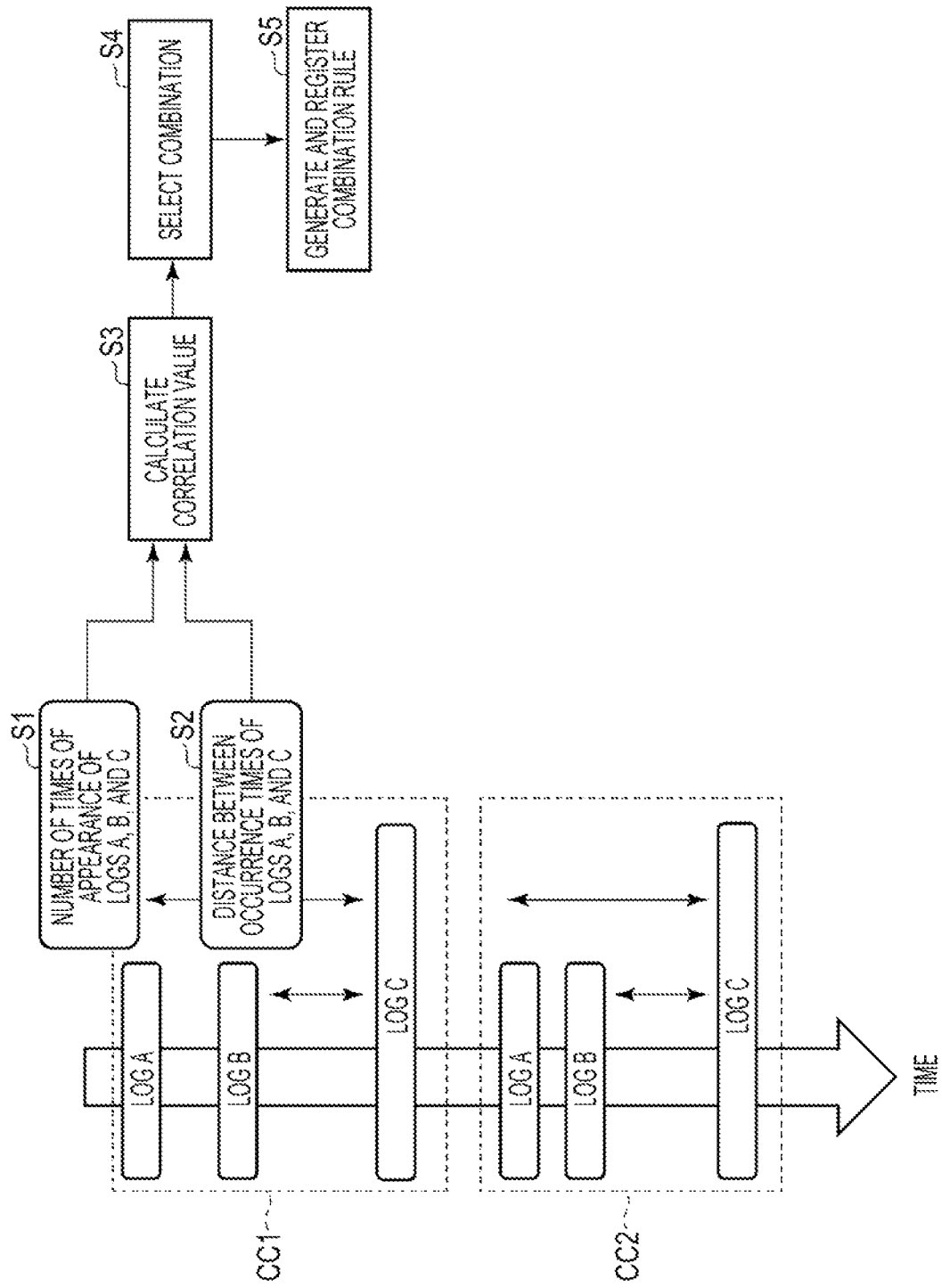
FIG. 4 is a diagram illustrating a principle of a combination rule creation processing operation by the network monitoring device shown in FIG. 3.

In a case where it is assumed that three logs A, B and C are sequentially generated as illustrated in FIG. 4, for example, in the combination of the target logs, the number of appearances X and the time difference Y are represented by:

X=nABC; and

Y=AVE (1/(|tC—tA|+|tC−tB|)). tA, tB and tC represent generation times of the logs A, B, and C, respectively, and AVE represents an average.

Under the control of the combination selection unit 132, the control unit 1 compares the correlation value calculated by the correlation value calculation unit 131 with a predetermined threshold and selects a combination of logs in which the correlation value is equal to or higher than the threshold in step S15. Consequently, in a case where combinations having a correlation value equal to or higher than the threshold repeatedly appear among combinations of logs in which the logs A, B, and C are sequentially generated, these combinations are put together as one representative combination and aggregated.

(2-3) Generating Combination Rule

Under the control of the combination rule generation unit 14, the control unit 1 generates a combination rule as follows.

In other words, under the control of the regular expression unit 141, m (=3 in the example stated above) logs included in the combination of logs selected by the event information aggregation unit 13 are converted into regular expression information according to the regular expression description stored in the regular expression database 32 in step S16.

For example, in a case where the log A is represented by:
%% SYSTEM_CONTROLLER−3−ERROR:
Error condition detected: SYSAD_PARITY_ERROR which defines a parity error of the processor, it is converted into
*SYSAD_PARITY_ERROR.*

In a case where the log B is represented by:
%% LTL-SP-2 LTL_PARITY_CHECK: LTL parity check request for 0 x [hex]

which defines a parity error of the ASIC, it is converted into
*LTL parity check.*

Similarly, in a case where the log C is represented by:
System received a Software forced crash* signal=0x17, code=0x24, context=0x619978a0 which defines a crash error, it is converted into
*Software forced crash.*

Examples of the errors stated above are cited from the following known materials, but are not limited thereto.

Internet
<URL, https://www.cisco.com/c/ja_jp/support/docs/switches/catalyst-6500-series-switches/116135-trouble-6500-parity-00.html>
<URL, https://www.cisco.com/c/ja_jp/support/docs/universal-gateways-access-servers/90-series-customer-premises-equipment/7900-crashes-router-troubleshooting.html>.

Under the control of the combination rule registration unit 142, in step S17, the control unit 1 generates a combination rule on the basis of the information representing the regular expression log combination. For example, in a case where the combination of logs selected by the event information aggregation unit 13 is a combination of logs A, B and C generated in order, Log *A*+Log *B*→Log *C* is generated.

The combination rule registration unit 142 stores the generated combination rule in the combination rule database 33 in association with a change pattern prepared in advance in step S18. As the change pattern, for example, a first pattern P1 and a second pattern P2 can be adopted.

The first pattern P1 defines, for example, in a case where a combination of selected logs includes logs A, B and C in order, processing of adding the log C while leaving the logs A and B when the logs A and B are generated in order.

The second pattern P2 defines, for example, in a case where a combination of selected logs includes logs A, B and C in order, processing of adding the log C while removing the logs A and B when the logs A and B are generated in order.

The control unit 1 determines whether or not the combination rule creation processing has ended for all combinations of logs in step S19. As a result of this determination, when there remains a combination for which a combination rule has not been created, the processing returns to step S13, and a series of combination rule creation processing in steps S13 to S18 is repeatedly executed on a combination for which a combination rule has not been created. On the other hand, in a case where the processing of creating the combination rule is completed for all the combinations of logs, the device returns to a standby state.

(II) Estimating Location where Failure Occurs

Figure 6:
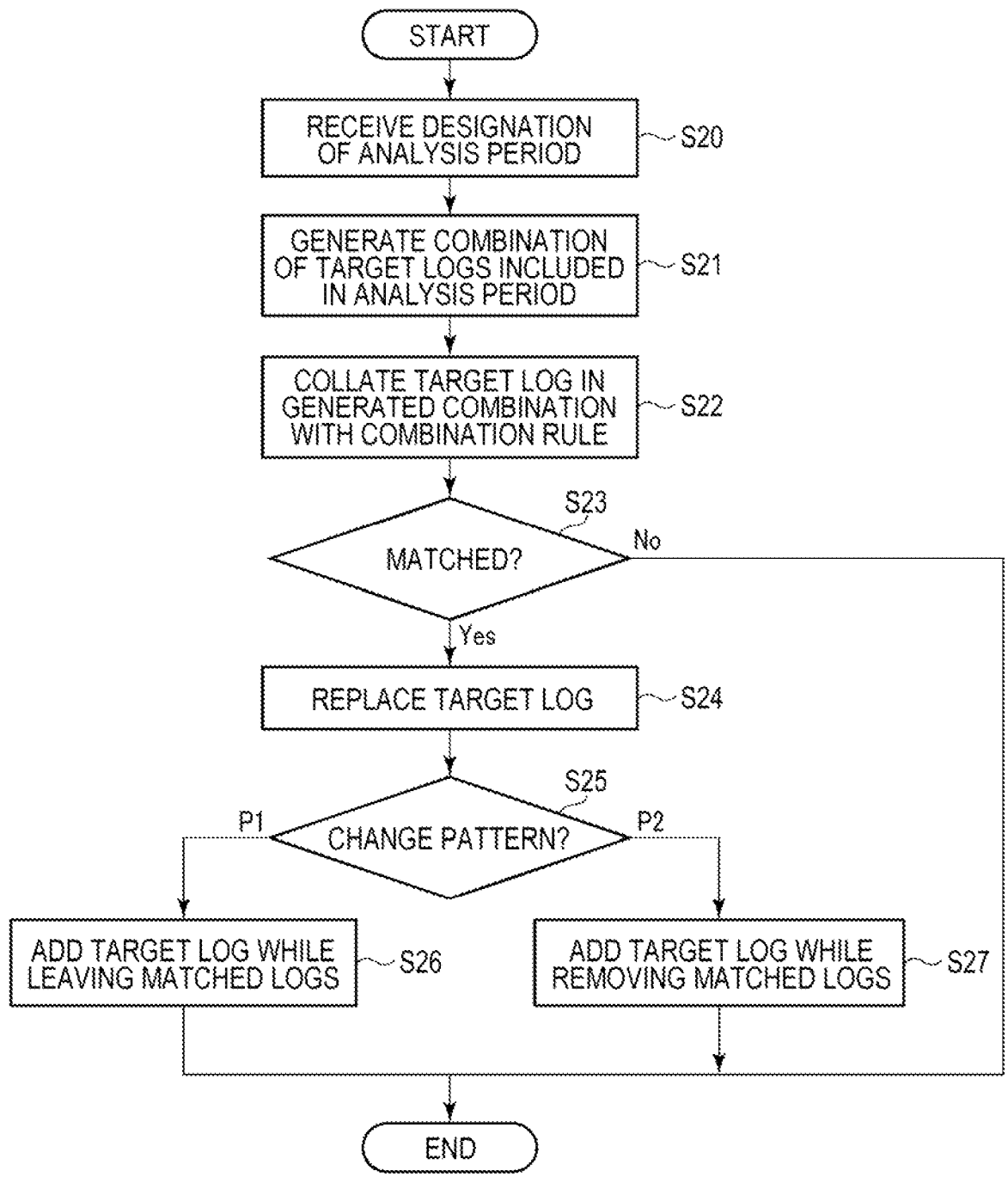
FIG. 6 is a flowchart illustrating a procedure and processing details of aggregation processing of event information to be monitored executed by the network monitoring device shown in FIG. 3.

When the processing of creating/registering the combination rule is completed, the control unit 1 of the network monitoring device SV executes processing of estimating a location at which failure occurs as follows. FIG. 6 is a flowchart illustrating a processing procedure and processing details for such estimation.

(1) Collecting Event Information

In a state where the combination rule of the logs to be monitored is registered, the network monitoring device SV monitors the occurrence of event information under the control of the event information collection unit 11. In this state, when the event information on failure is transmitted from the network devices ND1 to NDk, the event information collection unit 11 receives the event information via the communication I/F 5. The received event information is stored in the network log database 31 with information indicating the occurrence time of the failure included in the event information.

Figure 7:
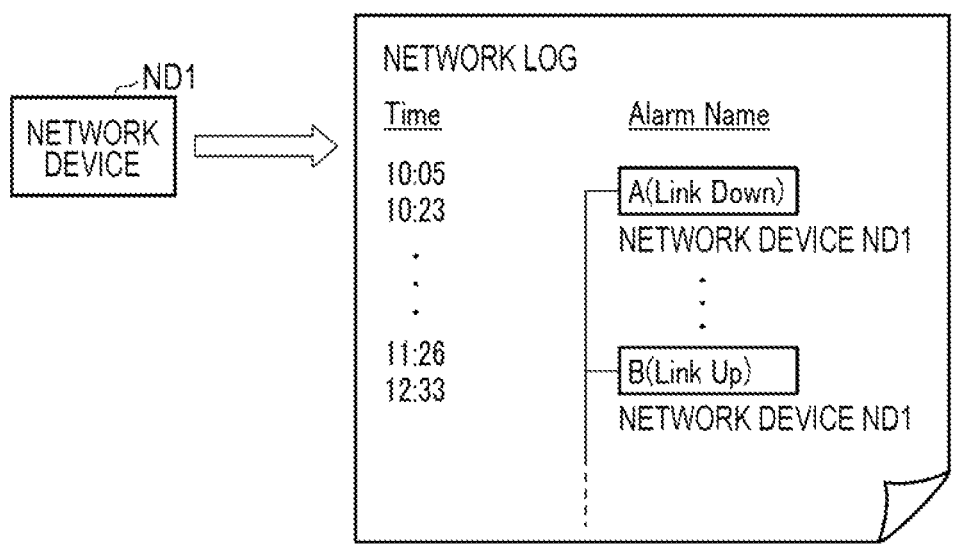
FIG. 7 is a diagram illustrating one example of a network log as event information.

FIG. 7 illustrates one example of the event information stored in the network log database 31. FIG. 7 shows a case where a network log A (Link Down) occurs at 10:05 to 10:23 and then a network log B (Link Up) occurs at 11:26 to 12:33 in the network device ND1.

(2) Extracting Event Combination

When the network log for, for example, a predetermined period is stored in the network log database 31, the controller 1 of the network monitoring device SV starts the processing of estimating the location at which failure occurs.

Figure 5:
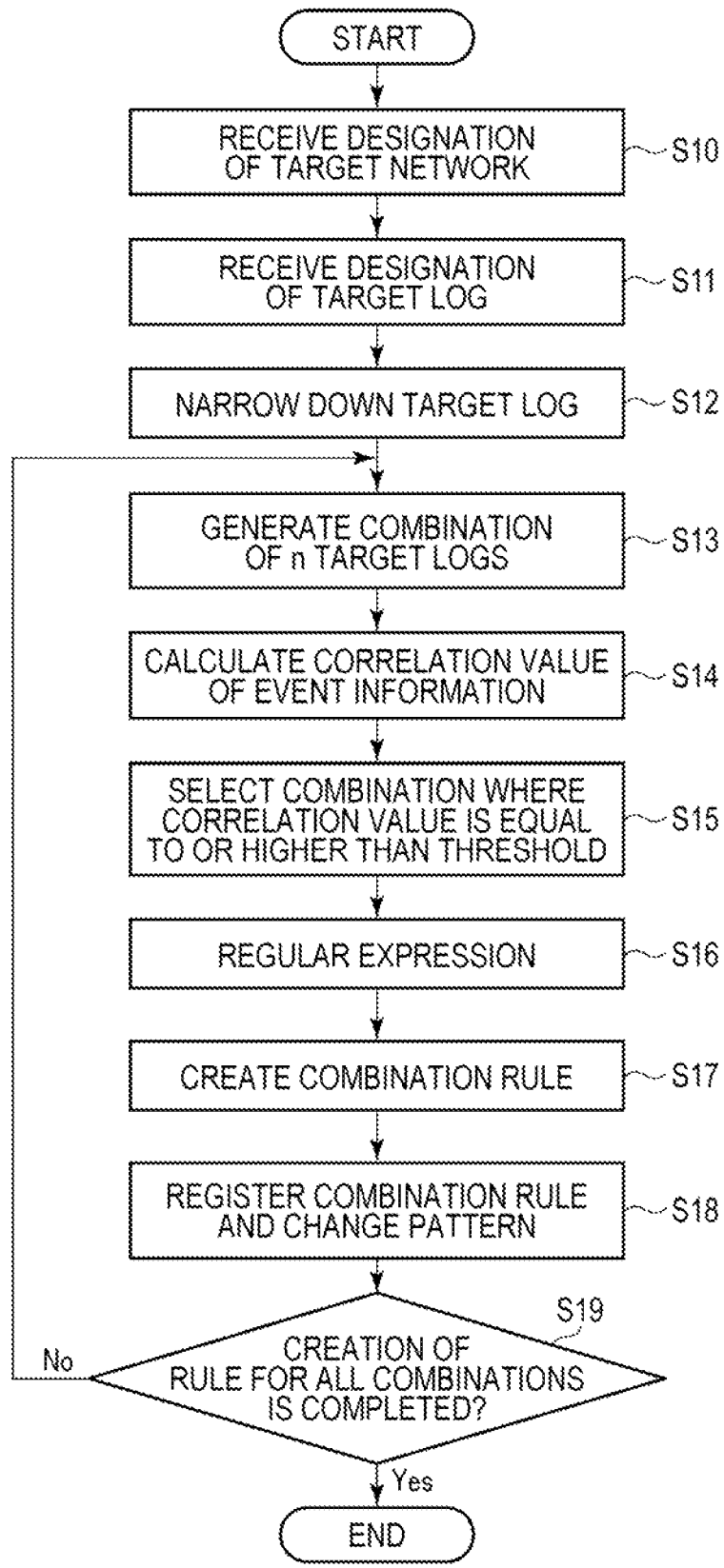
FIG. 5 is a flowchart illustrating a procedure and processing details of combination rule creation processing executed by the network monitoring device shown in FIG. 3.

In step S20, the controller 1 receives designation information of an analysis period (start time to end time) input by the network administrator from the input/output device 7. Under the control of the event information combination collation unit 15, the control unit 1 selects the network log generated in the analysis period designated by the designation information of the analysis period from the network log database 31, and generates a combination of target logs included in a unit time T in step S21. For example, assuming that the unit time T is 3 hours in FIG. 5, the event information combination collation unit 15 generates a combination of the event information A and B generated in 3 hours before the latest 12:33.

Prior to the generation of the combination of logs, as in the processing of creating the combination rule described above, when the designation information of the target log is received in advance, processing of narrowing down the target log may be performed based on, for example, the keyword or the number of appearances, designated by the designation information.

(3) Collating Event Information Combination

The event information combination collation unit 15 collates the generated combination of the event information A and B with the combination rule stored in the combination rule database 33 in step S22. At this time, collation of the event information is performed between pieces of event information in which the orders of occurrence correspond to each other.

In a case where there are several combinations of the event information, each of the combinations of the event information is collated with the combination rule. Furthermore, in a case where there are several combination rules, several combinations of event information are collated with all of the combination rules.

The event information combination collation unit 15 determines whether or not there is a combination with the same type and occurrence order as a combination of the event information to be monitored included in the combination rule among the combinations of the event information extracted, in step S23. When a matching combination rule is found, the event information changing unit 16 is notified of the result. In a case where the event information matches but the occurrence order is reverse, the event information combination collation unit 15 does not determine that the combination of the event information matches the combination rule.

(4) Changing Event Information Combination

When the determination result of matching is obtained by the event information combination collation unit 15, the control unit 1 performs log replacement processing according to the definition of the matched combination rule under the control of the event information changing unit 16 in step S24. For example, if it is defined as Log $A$+Log $B$→Log $C$ in the combination rule, the logs A and B are replaced with the log C.

The event information changing unit 16 reads out the change pattern stored together with the matched combination rule from the combination rule database 33 in step S25. It is determined whether the change pattern is the first pattern P1 or the second pattern P2 in step S25.

As a result of the determination, when the change pattern is, for example, the first pattern P1, the event information changing unit 16 performs, in step S26, processing of adding the log C to the corresponding network log stored in the network log database 31 while leaving the logs A and B determined to be matched in step S23.

Meanwhile, as a result of the determination, when the change pattern is, for example, the second pattern P2, the event information changing unit 16 performs, in step S27, processing of adding the log C to the corresponding network log stored in the network log database 31 while removing the logs A and B determined to be matched.

FIG. 8A illustrates a case where the new event information C as the change candidate, that is, "natural restoration" is added while leaving a combination of the event information A (Link Down) and the event information B (Link Up).

Figure 8B:
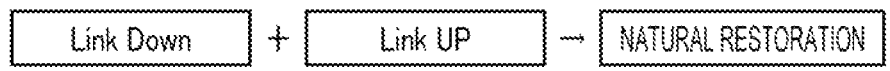
FIG. 8B is a diagram illustrating one example of a case where the past event information is replaced by the new event information.

FIG. 8B illustrates a case where the new event information C as the change candidate, that is, "natural restoration" is added while removing a combination of the event information A (Link Down) and the event information B (Link Up).

Figure 9:
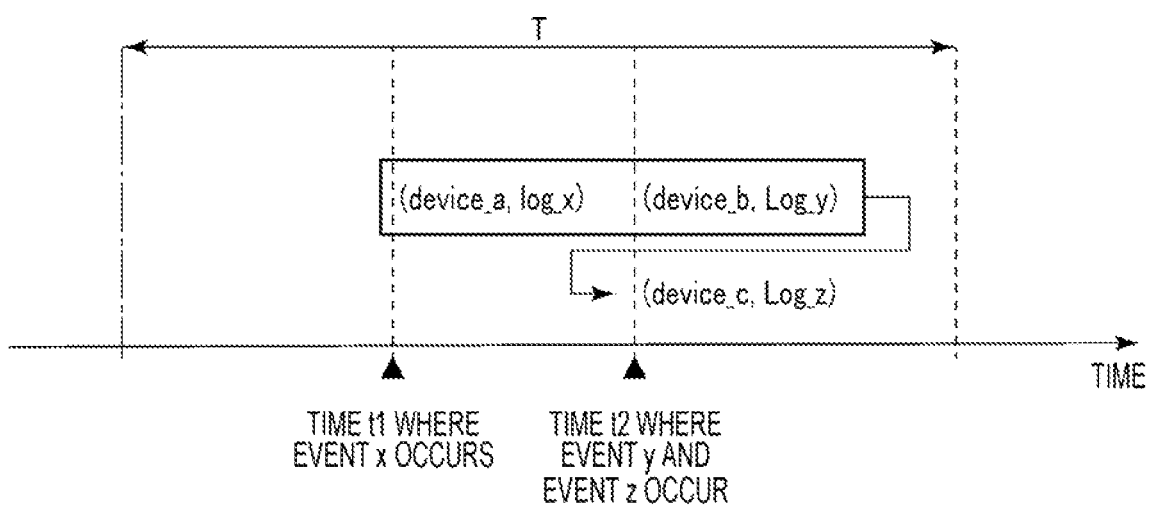
FIG. 9 is a diagram illustrating one example of a combination of event information to be monitored and one example of new event information generated in a case where the combination of the event information is detected.

FIG. 9 illustrates a modified example of the combination of the event information. In the example illustrated in FIG. 9, a combination of event information (device_a, log_x) generated at a time t1 within the unit time T and event information (device_b, log_y) generated at a time t2 within the same unit time T is removed, and new event information (device_c, log z) is added.

The control unit 1 of the network monitoring device SV executes processing of estimating a location at which failure occurs on the basis of the event information after the change stored in the network log database 31. For example, the processing method described in Patent Literature 1 can be applied as an estimation processing method for a location at which failure occurs.

Advantageous Effects

According to one embodiment as stated above in detail, when the combination rule of event information is created to estimate a location at which failure occurs from the pieces of event information generated in the network NW, the pieces of event information to be aggregated has a certain tendency in the number of times of appearance or appearance frequency according to the combination with a close temporal distance. Therefore, the control unit 1 calculates the correlation value for the plurality of combinations of event information including m (m≥3) pieces of event information generated from the pieces of event information collected from the network NW, and selects the combination of the pieces of event information for which the calculated correlation value is equal to or higher than the threshold, in which the correlation value increases as the number of times or frequency that the event information included in the combination appears according to the combination increases and also increases as the time interval between the pieces of event information included in the combination decreases, thereby generating the combination rule on the basis of the event information included in the selected combination.

Therefore, the pieces of event information repeatedly occurring with similar patterns among several pieces of event information occurring in the network NW are grouped into a smaller number in units of combinations thereof, so that a large number of pieces of event information can be grouped into representative event information to allow the event information to be aggregated into a smaller number. Consequently, the number of combination rules of event information to be monitored can be greatly reduced.

Accordingly, a learning time required to create the combination rule can be shortened, many of combination rules can be efficiently created in a short time, and the processing load of the network monitoring device SV can be reduced. Furthermore, since the aggregating the combinations of the event information can be automatically performed without depending on the network administrator, it is possible to greatly reduce the workload of the network administrator, and to further improve the efficiency of the network management operation together while reducing the processing load of the network monitoring device SV.

In the embodiment, prior to the processing of calculating the correlation value of the event information, the target event information is narrowed down based on the keyword, the number of appearances, or the appearance frequency. Therefore, the number of pieces of event information for which the correlation value is to be calculated can be appropriately reduced in advance, thereby further reducing the processing load on the network monitoring device SV required for the event information aggregation processing and reducing the time required for creating the combination rule.

OTHER EMBODIMENTS

In the embodiment stated above, a case where the functions of the event information aggregation unit 13 and the combination rule generation unit 14 are provided in the network monitoring device SV has been described as an example. However, the functions of the event information aggregation unit 13 and the combination rule generation unit 14 may be provided independently in a server device different from the network monitoring device SV or an information processing device such as a personal computer. Furthermore, the combination rule database may also be provided in another database server different from the network monitoring device SV. In this case, information transfer processing between the devices is performed via the network.

In addition to the processing procedure and processing details for creating the combination rule in the network monitoring device, types of the network and the network device, a type of the failure event to be monitored, and the combination thereof can be variously modified and implemented without departing from the scope of the present invention.

That is, the present invention is not limited to the embodiments stated above, and the constituent elements can be modified and implemented without departing from the gist of the invention. Various inventions can be formed by appropriately combining a plurality of the constituent elements disclosed in the embodiments stated above. For example, some constituent elements may be omitted out of all the constituent elements described in the embodiments. Moreover, the constituent elements in the different embodiments may be appropriately combined.

REFERENCE SIGNS LIST

SV network monitoring device
ND1 to NDk network device
NW network
1 control unit
2 program storage unit
3 data storage unit
4 input/output interface (input/output I/F)
5 communication interface (communication I/F)
6 bus
7 input/output device
11 event information collection unit
12 event information narrowing unit
13 event information aggregation unit
131 correlation value calculation unit
132 combination selection unit
14 combination rule generation unit
141 regular expression unit
142 combination rule registration unit
15 event information combination collation unit
16 event information changing unit
31 network log database
32 regular expression database
33 combination rule database

The invention claimed is:

1. A combination rule creation device that creates combination rule of event information to be monitored by aggregating a plurality of log events generated in a network, the device comprising:
  a processor; and
  a storage medium having computer program instructions stored thereon, when executed by the processor, perform to:
  receiving a plurality of log event generated in the network, where each log event indicates a failure or malfunction of a network device in the network;
  aggregating log events from the plurality of log events into combinations of log events, where each combination of log events includes at least three log events in sequential order:
  for each unique combination of log events, calculating a correlation value for a given combination of log events as a mathematical function of frequency of the given combination of log events and a time interval between log events in the given combination of log events, where the correlation value increases as the frequency of the given combination of log events increases and increases as the time interval between log events in the given combination of log events decreases;
  selecting a combination of log events for which the calculated correlation value is equal to or higher that a predetermined value;

generating a combination rule for the selected combination of log events on the basis of the log events included in the selected combination of log events; and storing the combination rule in a database.

2. The combination rule creation device according to claim 1, wherein the computer program instructions further perform to calculate the correlation value by performing weighted addition of an appearance correlation value that increases as the number of times or frequency that a combination of log events increases and a time correlation value that increases as a time interval between the log events in the combination of log events decreases.

3. The combination rule creation device according to claim 1, wherein the computer program instructions further perform to converting the log events for the selected combination of log events into a regular expression.

4. The combination rule creation device according to claim 1, wherein the computer program instructions further perform to store, in the database together with the combination rule, a first change pattern that defines processing of, in a case where target event information that matches a part of the event information included in the selected combination sequentially appears, leaving the appeared target event information, and adding target event information corresponding to another part of the event information included in the combination.

5. The combination rule creation device according to claim 1, wherein the computer program instructions further perform to store, in the database together with the combination rule, a second change pattern that defines processing of, in a case where target event information that matches a part of the event information constituting the selected combination sequentially appears, removing the appeared target event information, and adding target event information corresponding to another part of the event information constituting the combination.

6. A combination rule creation method executed by an information processing device that creates a combination rule of event information to be monitored by aggregating a plurality of log events generated in a network, the method comprising:

receiving a plurality of log event generated in the network, where each log event indicates a failure or malfunction of a network device in the network;

aggregating log events from the plurality of log events into combinations of log events, where each combination of log events includes at least three log events in sequential order;

for each unique combination of log events, calculating a correlation value for a given combination of log events as a mathematical function of frequency of the given combination of log events and a time interval between log events in the given combination of log events, where the correlation value increases as the frequency of the given combination of log events increases and increases as the time interval between log events in the given combination of log events decreases;

selecting a combination of log events for which the calculated correlation value is equal to or higher that a predetermined value;

generating a combination rule for the selected combination of log events on the basis of the log events included in the selected combination of log events; and storing the combination rule in a database.

7. A non-transitory computer-readable medium having computer-executable instructions that, upon execution of the instructions by a processor of a computer, cause the computer to function as the combination rule creation device as set forth in claim 1.

8. The method of claim 6 further comprises calculating a correlation value according to $$Z=\alpha X+\beta(1/Y)$$

where X is the number of appearance of the given combination of log events, Y is the time interval, and $\alpha$ and $\beta$ are adjustment coefficients.

9. The method of claim 6 furthers comprises estimating a location at which a failure occurs on the basis of the combination rule stored in the database.

* * * * *